July 9, 1929.　　　H. W. BUNDY　　　1,720,508
METHOD OF MAKING FINNED TUBING
Filed April 27, 1927
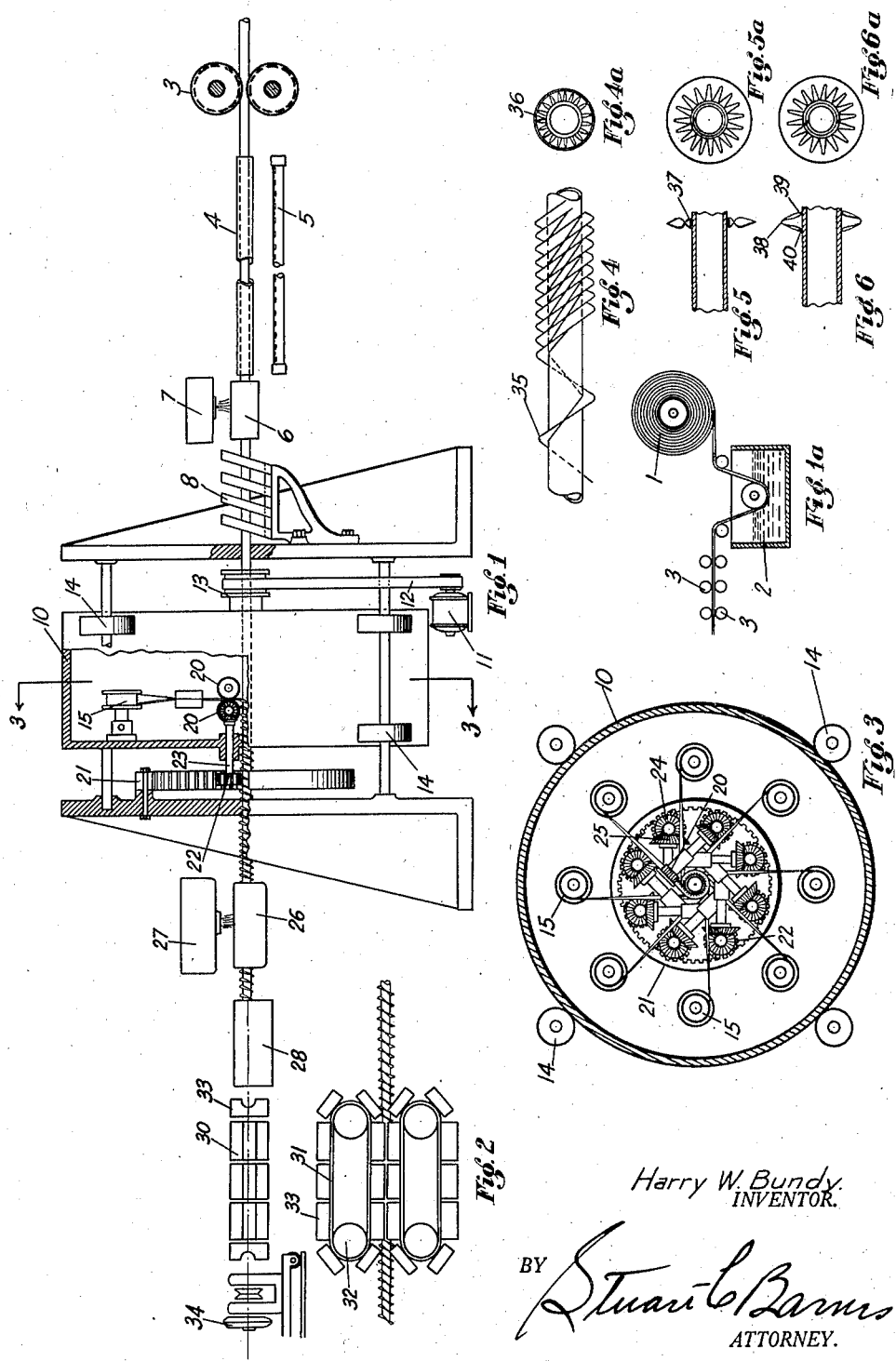
Harry W. Bundy,
INVENTOR.
BY Stuart C. Barnes
ATTORNEY.

Patented July 9, 1929.

1,720,508

UNITED STATES PATENT OFFICE.

HARRY W. BUNDY, OF DETROIT, MICHIGAN, ASSIGNOR, BY MESNE ASSIGNMENTS, TO BUNDY TUBING COMPANY, OF DETROIT, MICHIGAN, A CORPORATION OF MICHIGAN.

METHOD OF MAKING FINNED TUBING.

Application filed April 27, 1927. Serial No. 187,079.

This invention relates to a method of making finned tubing which is useful in various kinds of heat exchange devices.

The invention aims to provide a method by which the fins can be securely united to the tube in a rapid manner. Accordingly, the method contemplates applying the fins to long lengths of tube, or to substantially continuous lengths of tube, which may be later cut into sections of desired length. One of the important features of the method is that the application of the fins to the tube may be accomplished as the tube itself is formed.

The drawings attached hereto diagrammatically show the carrying out of the method and in these drawings:

Fig. 1 is a diagrammatic view showing the several operations through which the tube passes.

Fig. 1ª is a diagrammatic view showing tube forming rolls which form a tube from flat strip stock.

Fig. 2 is a side elevation diagrammatically showing a pulling mechanism for the tube.

Fig. 3 is a section taken on line 3—3 of Fig. 1.

Figs. 4 and 4ª are side and sectional view respectively of a finned tube.

Figs. 5 and 5ª are sectional views showing a modified form of fin.

Figs. 6 and 6ª are views showing a still further modified form of fin.

A supply of strip stock 1, carried by a spool, is moved over guide rollers through an acid bath, and then the strip stock is formed into a tube by the battery of forming rolls 3 (Fig. 1ª). The strip stock is either tinned after it is drawn from the roll, or it is in a tinned condition when in the roll; this latter is thought to be preferable. After the tube is thus formed by the rolls 3 it passes through a sweating die 4 heated by a burner 5, and the tinned metal is bonded together by the heating of the tin. The tube is then moved through a solder pot 6, where it is given a solder bath, the supply of solder being maintained to a proper level by the supply pot 7. After the solder bath the tube is moved through a battery of wiping dies 8 for removing the excess solder. The tubing may be either a single or double ply tubing. One manner in which such tubing is made in double ply form is shown in my Patent No. 1,650,321 of November 22nd, 1927.

After the tube is thus formed, the fin stock is applied. For this purpose the tube is passed through a rotating drum-like arrangement for applying the fin stock, the tube moving longitudinally but not rotating. The drum-like arrangement is referenced 10, and it is rotated by a suitable motor 11, a drive chain or belt 12, and pulley 13.

As will be noted in Fig. 3, the drum is supported upon a plurality of rollers 14. This drum carries the fin stock and as shown there are eight spools or supply rolls of fin stock, as referenced 15. The fin stock from each roll is directed to the tubing, and it will be seen that as the tube moves longitudinally and as the drum 12 rotates the fin stock is wound upon the tubing as it is drawn from the supplies 16. The fin stock in the rolls at 15 is preferably flat strip stock, and it follows that in order to wrap the fin stock around the tube, the stock must be crimped on its inner edge. In order to do this a pair of crimping rollers 20 for each supply is provided. These rollers engage the strip stock and crimp the same just prior to the wrapping of the stock around the tube. The rollers are positively driven, and for this purpose an internal gear 21, which is held stationary, is provided, and each crimping device is rotated through the means of a gear 22, shaft 23 and intermeshing pinions 24 and 25.

At the time the tube passes through the fin applying step, it is still in the heated condition and it has a certain amount of solder on its exterior surface. Excess solder has been removed by the wiper dies 8, but sufficient solder remains to form an initial union between the fin stock and the tube. With the fin stock thus applied the tube passes on, and is given another coating of solder as at 26, the solder supply being maintained from the solder pot 27. The tube is then passed through a cooler 28.

The tube is engaged by a pulling device referenced generally 30. This pulling device is diagrammatically shown as including a pair of pullers including rotating belt members 31, moving over rollers 32, and each carrying gripping blocks 33 which are recessed according to the shape of the finished fin stock, and which blocks meet, engage the tube on opposite sides and draw the same forward. This pulling aids in moving the tube along and supports the same for operation on the tube of a cut-off device. Finally, a cut-off mechanism 34, preferably of an automatic type, acts to sever in the predetermined lengths, the completed tubing.

Fig. 4 is a view of part of a section of tubing having fin stock applied thereto in the spirals of eight, as would be in the case with the apparatus just described. At the left hand side of the figure a single spiral of fin stock 35 is shown, the other spirals being omitted. Fig. 4$^a$ is a sectional view taken through Fig. 4 showing at 36 how the stock is crimped. In Fig. 5 a fin is shown which is provided with an edge which is turned over as at 37, thus forming a flat abutting portion for resting against the tube. As shown in Fig. 6 the fin stock is longitudinally folded at 38, and the two edges of the fin stock 39 and 40 are crimped and abut against the tubing. These are various forms of fins which can be applied to the tubing in accordance with the present method.

It will be understood that the number of supply rolls of fin stock can be varied to meet varying conditions. It will be appreciated that the greater the number of supply rolls of fin stock the faster the work is accomplished at a given speed of drum rotation. Thus the application of the fins to the tube can be nicely co-ordinated with the formation of the tube itself, in that, not only can the speed of the drum be regulated but the number of rolls of fin stock can be determined to meet particular conditions. Again, in some tubing, the fins would want to be applied thicker than in other tubing. Under given operating conditions a mechanism of eight rolls of fin stock applies eight fins to a given length of tube, in a single rotation, and a mechanism having six rolls would apply six fins to the same length of tube. All these things can be varied in numerous different ways to make a final product which meets the demand of the particular use to which it is to be put.

As has been stated, the method of applying the fin stock can be nicely coordinated with the making of the tubing itself. However, the method of putting on fin stock has a broader scope, and fin stock may be put onto all kinds of tubes; as for example, seamless tubes or lock-seam tubes, both of which differentiate from the rolled tube, as depicted in the drawing. Moreover, the method of putting on the fin stock may be isolated from the manufacturing of the tube; that is, the tubes may be made up and the fin stock may be applied some later time. In doing this, solder may be applied to the tubes when they are being manufactured so that when the fin stock is applied, heating of the tube is all that is necessary before applying the fin stock. Again, the tubes may be made up and completed without the use of solder on their exterior, and the solder may be applied to the tube during the method of winding the fin stock thereon.

Claims:

1. The method of making finned tubing which comprises forming the tubing from flat strip stock while holding both the stock and tube against rotation, soldering the tubing, passing the tube longitudinally while it remains attached to the strip stock and applying the fin stock to the tubing in multiple spirals while the said solder on the tube is in a heated condition.

2. The method of making finned tubing which comprises forming strip stock transversely into a tube during longitudinal and non-rotative movement of the stock and formed tube, applying solder to complete the tube and then wrapping fin stock on the tube in multiple spirals while the solder is in a heated condition and while the tube is moving longitudinally and remains attached to the strip stock.

3. The method of making finned tubing which comprises forming flat strip stock from a supply and forming the same into tubing with continuous longitudinal movement of the tubing, holding the tube from rotation and winding fin stock in multiple spirals on the tubing during its continuous longitudinal movement and while it remains attached to the flat strip stock.

4. The method of making finned tubing which comprises forming flat strip stock from a supply and forming the same into tubing with continuous longitudinal movement of the tubing without rotation of the tubing, and winding fin stock in multiple spirals on the tubing as the same is thus moving longitudinally and while it remains attached to the flat strip stock.

5. The method of making finned tubing which comprises passing a tube longitudinally through a battery of supply rolls of fin stock, holding the tube from rotation, and winding the fin stock on the tube by rotation of the supply rolls of fin stock around the tube.

6. The method of making finned tubing which comprises passing a tube longitudinally and holding the tube against rotation and winding fin stock on the tube in multiple spirals by rotating a battery of supplies of fin stock around the tube as the same is passing longitudinally.

7. The method of making finned tubing which comprises passing the tube longitudinally and holding the same against rotation, applying solder to the tube, removing excess solder, winding fin stock on the tube as the tube is longitudinally moving and while the solder remaining on the tube is in a heated condition, applying more solder to the tube to securely fix the fin stock on the tubing, and then cooling the finned tubing as it is longitudinally moving.

In testimony whereof I affix my signature.

HARRY W. BUNDY.